United States Patent [19]

Valdes

[11] Patent Number: 5,019,414
[45] Date of Patent: May 28, 1991

[54] PIPEABLE GELLED FOOD AND ETHYL ALCOHOL BEVERAGES

[76] Inventor: Mario A. Valdes, 10 Wait Street, Apt. #202, Boston, Mass. 02120

[21] Appl. No.: 442,061

[22] Filed: Nov. 28, 1989

Related U.S. Application Data

[63] Continuation-in-part of Ser. No. 205,153, Jun. 6, 1988, abandoned, which is a continuation-in-part of Ser. No. 936,269, Dec. 1, 1986, abandoned.

[51] Int. Cl.$^5$ .................. A23L 1/0534; A23L 1/0532
[52] U.S. Cl. ..................................... 426/573; 426/592
[58] Field of Search ............... 426/573, 574, 575, 576, 426/577, 578, 590, 592

[56] References Cited

U.S. PATENT DOCUMENTS

| | | | |
|---|---|---|---|
| 3,436,224 | 4/1969 | Bode | 426/592 |
| 3,554,771 | 1/1971 | Wiczer | 426/573 |
| 3,795,747 | 3/1974 | Mitchell et al. | 426/592 |
| 3,843,809 | 10/1974 | Luck | 426/592 |

FOREIGN PATENT DOCUMENTS

| | | | |
|---|---|---|---|
| 2162045 | 6/1972 | Fed. Rep. of Germany | 426/592 |
| 3333278 | 4/1985 | Fed. Rep. of Germany | 426/592 |
| 2603046 | 2/1988 | France | 426/592 |
| 0001035 | 1/1980 | Japan | 426/592 |
| 0056669 | 4/1983 | Japan | 426/592 |
| 326447 | 3/1930 | United Kingdom | 426/573 |

*Primary Examiner*—Jeanette Hunter
*Attorney, Agent, or Firm*—George W. Dishong

[57] ABSTRACT

This invention relates to food of as little caloric value as desired made into spreadable gels, ideally transparent for certain usages and opaque for others, similar in consistency to mayonnaise or butter at room temperature. The taste release of such gels is superior to that of other products served set or molded. Such is true because the more divided or fractioned a food is, the more surface area available with which the taste buds of the tongue may interact. Fruit spreads may thus be produced using less sugar or concentrate than those formulated with either pectin or gelatin. The gels are made pipeable by fractioning set gels using at least a 325 mesh sieve. After fractioning the gel is remixed producing a pipeable gel.

The invention relates to a gelled form or non-beverage form of ethyl alcohol and to the method for making gelled ethyl alcohol and to the products formed from such gelled alcohol. The method, involves the addition of or the mixing of ethyl alcohol beverage products with carboxymethylcellulose (CMC) having a degree of substitution of 7. Addition of carrageenan further increased the viscosity of the product to the degree that the product becomes a set gel and is thus moldable. Gels formed using the CMC can further be made into set gels with the addition of an aluminum salt such as basic aluminum acetate (BAA) or aluminum formoacetate (AFA). Thus the non-beverage form of the alcoholic beverage product, with the addition of aluminum salt, can be made in the form of a set gel. Upon fractioning of a firm/set gel, by sieving through a fine mesh sieve, one obtains a pipeable gel i.e., one which can be dispensed through a pipe of the type used in cake decorating.

14 Claims, No Drawings

PIPEABLE GELLED FOOD AND ETHYL ALCOHOL BEVERAGES

RELATED APPLICATION

This application is a continuation-in-part of copending application Ser. No. 205,153, filed June 6, 1988 now abandoned which is a continuation-in-part of Ser. No. 936,269 filed on Dec. 1, 1986 now abandoned.

BACKGROUND OF THE INVENTION

1. Field of the Invention

This invention relates to an edible thickened or gelled composition of a liquid form of food product and the method of making same. More particularly this invention relates to food of as little caloric value as desired made into spreadable or pipeable gels, ideally transparant for certain usages and opaque for others, similar in consistency to mayonnaise or butter at room temperature. The gels are made pipeable by fractioning set gels using at least a 325 mesh sieve. After fractioning the gel is remixed producing a pipeable gel.

This invention further relates to the field of ethyl alcohol and to the beverages and the other products made from less than 100% or 200 proof ethyl alcohol. More particularly this invention relates to a gelled form of such ethyl alcohol and to the method for making gelled ethyl alcohol and to the products formed from such gelled alcohol. This invention further relates to the field of ethyl alcohol and to the beverages and the other products made from less than 100% by volume or 200 proof ethyl alcohol. More particularly this invention relates to a gelled form or non-beverage form of such ethyl alcohol and to the method for making gelled ethyl alcohol and to the products formed from such gelled alcohol. The method for obtaining gelled or syrupy alcohol products, or a non-beverage form of the alcoholic beverage product from alcohol beverage products, involves the addition of or the mixing of ethyl alcohol beverage products with carboxymethylcellulose (CMC). Addition of carrageenan further increased the viscosity of the product to the degree that the product becomes a set gel and is thus moldable. Gels formed using CMC can further be made into set gels with the addition of an aluminum salt such as basic aluminum acetate (BAA) or aluminum formoacetate (AFA). Thus the non-beverage form of the alcoholic beverage product, with the addition of aluminum salt, can be made in the form of a set gel. Upon fractioning of a firm/set gel, by sieving through a fine mesh sieve, one obtains a pipeable gel i.e., one which can be dispensed through a pipe of the type used in cake decorating.

2. Description of the Prior Art

Piping gels sold in the confectionary sections of supermarkets etc. most closely resemble the instant invention. These, however, are made with around 90% cornsyrup and sugar and appear opaque if piped from a nozzle larger than ¼ inch in diameter. Presently cornsyrup and sugars of various types have been standardly used to impart to a range of foods shape retaining properties and spreading behavior. The consistency associated with such gels implies, to most users, a high caloric content. I.e., sugars, oils or fats and milk or cheeses have been associated with the known piping gels.

According to the present invention, a spreadable or pipeable gel can be prepared, for example, with absolutely no sweetening solids such as cornsyrup or sugar and with a high degree of transparency at thicknesses that can be measured in inches. Considering the consumer's ever increasing demand for fewer and fewer calories, the instant invention will also provide a valuable alternative for the high calorie food items that have been used as additives to obtain pipeable gels.

As far as is known to the Applicant, ethyl alcohol and the products having ethyl alcohol as a basic component thereof are made into a syrup form through the admixture of substantial amounts of sugar. Such addition of sugar greatly alters the basic taste or flavor of the alcohol product and substantially reduces the per unit amount of alcohol, or the alcoholic proof, of the product. Currently there is no process for making an ethyl alcoholic beverage type of product into a syrup or gelled or molded form while still retaining the fundamental flavor or taste of the product and also substantially retaining the alcoholic content per unit of volume, or the proof of the product at the proof level of the product as it is found in the beverage form.

There has been considerable effort in the past to produce ethyl alcohol products in other than beverage form. So-called adult candies have been produced which have a very diluted alcohol base. There has been a desire by the liquor industry to expand the product line into areas other than beverages such as syrups which could be used as toppings for deserts, jam or jelly-like products for spreading, dipping or as a fondue with fruits or snack foods, molded or formed products which would maintain shape without the need for refrigeration, cream drinks, puddings, for use in cooking and the like. It has not been satisfactory or acceptable to dilute the ethyl alcohol basic component of the products by the addition of a heavy sugar-type syrup.

In U.S. Pat. No. 3,418,133, EDIBLE SPREADS OF UNCTUOUS CONSISTENCY AND LOW CALORIE VALUE there is disclosed and claimed and edible spread prepared mainly from water, sodium carboxymethylcellulose (CMC), and relatively small amounts of taste and odor imparting ingredients. The degree of substitution of the CMC is between 0.1 and 0.6 noting that the range of effective degree of substitution varies with the viscosity of the CMC. It is well known that CMC has many uses in the food industry but there is no suggestion for the use of CMC in the alcoholic beverage industry other than to impart "mouthfeel" to existing beverage types and to act as a stabilizer.

In all that has been published, including the work of Martin Glicksman, *FOOD HYDROCOLLOIDS*; Volume III, CRC Press, Inc. Boca Raton, Florida, there is no suggestion for the gelation of an alcohol product or beverage using either CMC alone or in combination with carrageenan. A reference has been made regarding the use of CMC in alcoholic beverages as a stabilizer and as a mouthfeel producing agent. The recommended usage of 0.50% is far too low a level to alter the state of the beverage from that of a liquid and to result in a gel form for the alcoholic product to which the CMC was added. See for example, *FOOD HYDROCOLLOIDS*; Vol. III, p. 50 it is noted that; "It [CMC] is insoluble in pure organic solvents. However, solubility occurs in mixtures of water and water-miscible organic solvents such as short-chain alcohols (e.g., ethanol). Table 4 shows the tolerance of various molecular weight grades of CMC to a mixed solvent system. The low-viscosity types are considerably more tolerant to increasing ethanol concentration than higher-viscosity types. CMC solutions of low concentration can be made with up to 50% ethanol or 40% acetone. Since ethanol is used to precipitate most gums during manufacture, the excellent tolerance of CMC to considerable ethanol concentration in a mixed solvent is unique. This property becomes very important in the application of CMC as a stabilizer to alcoholic beverages and instant bar mixes where clarity and viscosity are needed." [Emphasis added]. See also pp. 87-88, section c. Also on p 115 there is noted that hydroxypropylcellulose is soluble in aqueous alcohol. It is important to note that there is no suggestion to use CMC for the purpose of creating novel products only as a stabilizer and to create "mouth-feel".

The invention disclosed herein is very particularly directed toward a product and the making of a product meant for human consumption which product is substantially an alternate form of alcoholic beverage products available in the marketplace around the world. The invention disclosed herein is also very particularly directed toward a product and the making of a product meant for human consumption which product is substantially a low calorie alternate form of gelled food products which are pipeable. The alternate form or non liquid form of alcoholic beverage product can also be made as a clear pipeable gel by the methods of this invention. Applicant is aware of no other product of the type disclosed and claimed by Applicant. Neither U.S. Pat. No. 3,374,224 to Sommers, R. nor the U.S. Pat. No. 4,507,473 to Bernert et al, discloses, claims or suggests in any way the product disclosed by Applicant herein. Both substantially teach methods and apparatus used in the making of and the preparation of carboxymethylcellulose. What Applicant has invented and disclosed is certainly very useful and is a significant advance over the prior art of gelling alcoholic beverages.

Ethyl alcohol which is less than substantially 100% by volume and the products made therefrom, as far as applicant is aware, have never been made in molded, gelled, or syrup form while maintaining substantially the same proof and flavor. It is widely acknowledged that the liquor industry is in need of new products and is in need of new markets for the products. Notwithstanding such needs, the industry has not been able to produce new forms of ethyl alcoholic products so that such new market areas can be exploited.

It should be noted that in the products literature such as *Hercules ® CELLULOSE GUM Sodium Carboxymethylcellulose, Chemical and Physical Properties*; Hercules Incorporated, 1984, wherein many uses are proposed by the supplier. Among the cellulose derivatives useful in the food industry the carboxymethylcellulose (CMC) is of the major importance. Carboxymethylcellulose finds many food application: it is often used as an ingredient in ice cream stabilizers, in dairy substitutes, in puddings, frozen foods, in citrus fruit concentrates, sauces and gravies, and in baked items. In food preservation the film-forming capability of CMC solutions is applied in meats and fish products. CMC is also a good encapsulating agent for emulsifying fats and oils.

The carboxymethylcellulose is generally recognized as safe (GRAS) in foods. There are a number of standardized foods which permit the use of CMC without further ingredient declaration. If label statements are made, the terms "cellulose gum" or "sodium carboxymethylcellulose" are appropriate for use. Thus, where products for human consumption are involved, it is acceptable to use the above terms without any further detail relative to the chemical composition of the product CMC.

There is no hint or suggestion in the CMC product literature to use CMC in combination with ethyl alcoholic beverage products to change the form of the product from a beverage to another form such as syrup, gell, spread etc. Given the size of the liquor beverage market, suppliers of CMC would have a sincere interest in providing the product CMC to the liquor industry.

Applicant has provided herewith a copy of a piece of product literature which describes the CMC in detail. Such literature provided is incorporated herein and made a part of this disclosure.

SUMMARY OF THE INVENTION

The present invention is directed to an edible thickened or gelled composition of a liquid form of food product comprising: a weight amount of liquid form of food product to be gelled; food grade carboxymethylcellulose in an amount of between about 0.80% and about 3.00% of said amount by weight of said liquid form of food product and wherein said food grade carboxymethylcellulose is characterized by having a degree of substitution of 7. The gelled composition may further have food grade carrageenan in an amount of between about 0.20% and 2.25% of said amount of said carboxymethylcellulose and wherein said composition may have been fractioned through a fine mesh sieve and recombined to form a pipeable gel composition.

The present invention in its most simple embodiment, is also directed to ethyl alcohol products (in other than liquid form) comprising less than about 200 proof ethyl alcohol, at least 0.80% by weight of carboxymethylcellulose (CMC) such as can be obtained from Hercules Incorporated under the name Hercules cellulose gum and described in *Hercules ® Cellulose GUM Sodium Carboxymethylcellulose, Chemical and Physical Properties*; Hercules Incorporated, 1984.

The present invention is also directed to ethyl alcohol products (in other than liquid form) comprising less than about 200 proof ethyl alcohol, at least 0.80% by weight of carboxymethylcellulose (CMC) also having added between about 0.20% by weight and 0.60% by weight of carrageenan which material is described in *CARRAGEENAN*; The Copenhagen Pectin Factory Ltd., A Wholly Owned Subsidiary of Hercules Inc.

The applications of this invention will be limited only by the industry's imagination. Beside non caloric piping gels, transparent butter type cake frostins are now possible. Spread or piped on biscuits or pastry, the invention has great potential as a visual enhancer especially if liberally swirled, globbed or piped through a nozzle at least ¼ inch in diameter.

It is further pointed out that the impossibility of freezing alcohol presents another and perhaps most novel feature. The invention could be defined as a process for adding a high concentration of an alcoholic beverage to frozen desserts such as ice cream, ice milk, sherbet, frozen yogurt, etc., without melting them. Gelled alcoholic beverages rippled, folded in or utilized as a topping, inhibits the antifreeze action of the alcohol so long, of course, as the gel is incorporated after the dessert has been frozen. Once firm, the ice cream, ice milk, etc. will not interact with either the alcoholic or the CMC components of the gel if it is thickened with at least 1% of the gum discussed. Increased viscosity of the gel by temperature reduction is also a contributing factor to this particular method of incorporating alcohol to a frozen dessert without melting the latter.

It is an object of the present invention to provide a spreadable or pipeable gel with absolutely no sweetener as required for obtaining the gel and with a high degree of transparancy even at thickness measured in inches. The pipeable gel may be a transparent butter type for cake frostings or may be piped onto biscuits or pastry or dispenseable in a manner similar to that of soft ice cream. The pipeable gel is easily tongue destructable.

It is a primary object of the present invention to provide for example, gelled, syrup, spreadable or pipeable forms of alcoholic beverage products having proofs and flavors substantially the same as the proofs and flavors of the alcohol products in beverage form.

Another primary object of the invention is to provide a simple process for converting or otherwise producing gellied, gelled, spreadable or syrup forms of alcoholic beverage products which have substantially the proof and flavor of the beverage form of the alcoholic product by mixing with the less than 200 proof ethyl alcohol or the beverage product containing such ethyl alcohol the appropriate amount of CMC which will result in the product form desired. A predetermined amount of carrageenan may also be added to the above mixture which will cause the mixed product to have a more firm form so as to stand up as for example, like whipped cream.

A still further object of the invention is to provide alcoholic products which are in forms which could be used as dips, spreads, fillings, cooking and/or baking ingredients and which have the proof and flavor of the beverage form of the alcoholic product.

These and further objects of the present invention will become apparant to those skilled in the art after a study of the present disclosure of the invention.

DESCRIPTION OF THE PREFERRED EMBODIMENTS

Prior to discussing the various embodiments of the instant invention, a discussion of the compound or product known as CMC or carboxymethylcellulose will be provided.

Although carboxymethylcellulose is a very common compound and is known as CMC a brief description of the product will be given. However, notwithstanding the description herein given, the complete characteristics of the material in forms found useable by Applicant within the products and the processes of this invention, can be obtained from the technical literature of the companies who supply the material for all of its presently known varied uses. Some of the publications which completely disclose the nature of CMC are: *Hercules ® CELLULOSE GUM Sodium Carboxymethylcellulose, Chemical and Physical Properties*; Hercules Incorporated, 1984; *CARBOXEL*, Chemical Developments of Canada Limited; and The Merck Index 10th edition (1983) Item 1812, Carboxymethylcellulose Sodium. In all of these references the material is referred to as CMC.

Carboxymethylcellulose is a polysaccharide gum and is available commercially as the sodium salt, sodium carboxymethylcellulose or (CMC). This water-dispersible ether of cellulose, is easily prepared. Cellulose is the form of wood pulp or cotton linters is reacted with sodium hydroxide to yield alkali cellulose. The alkali celluloise is then treated with sodium monochloroacetate to give sodium carboxymethylcellulose.

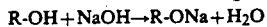

$$R\text{-}OH + NaOH \rightarrow R\text{-}ONa + H_2O$$

$$R\text{-}ONa + Cl\text{-}CH_2COONa \rightarrow R\text{-}O\text{-}CH_2OONa + NaCl$$

The properties and performance of each batch of CMC depend on: (1) the degree of substitution (D.S.) and (2) the degree of polymerization (D.P.). The degree of substitution (D.S.) is the number of hydroxyl groups on each anhydroglucose unit which is substituted by the carboxymethyl group.

Each anhydroglucose unit has 3 hydroxyl groups with which the monochloracetic acid can react, hence the maximum theoretical D.S. is 3. In practice, however, the D.S. is much lower and the preparative reaction is controlled towards this end since preparations with a D.S. much lower than 3 have much better dispersibility and other desirable physical properties. D.S. values of commercial samples usually range between 0.4–1.2. Food grade CMC has D.S. values no greater than 0.9 and is dispersible in cold as well as hot water.

The properties of CMC depend on both the D.S. and the D.P. Preparations with a D.S. of 0.3 or less are dispersible in alkali but not in water. Good dispersibility in water is shown by samples having a D.S. of 0.45 or higher. Viscosity depends greatly on the D.P.; the greater the D.P., the higher the viscosity. Another factor which determines the property of CMC dispersions is the uniformity of substitution. Smoother and less thixotropic dispersions are formed when the substitution is rather uniform.

The viscosity of CMC dispersions varies greatly depending on the type of CMC. A 2% dispersion may give viscosities of 10–50,000 cps or higher. Heating reduces the viscosity but it returns on cooling. Viscosity is affected by pH, also. Below pH 5, it decreases. Precipitation of the gum occurs at below pH 2–3, due to the insolubility of the polymer in this pH range. Viscosity is quite stable a pH 5–11, the best stability occuring at pH 7–9.

Stability in the presence of salts depends on the valency of the metal cations. Trivalent cations such as ferric and aluminum and several divalent cations, such as $Cu^{++}$ will precipitate the gum, but monovalent metallic cations usually form soluble salts.

Among the cellulose derivatives useful in the food industry the carboxymethylcellulose (CMC) is of the major importance. In CMC the basic polymeric structure of the cellulose is chemically modified by the introduction of the sodium carboxymethyl groups ($-CH_2COONa$). The presence of this group lends ionizable groups and negative ionic charges to the nonionic cellulose chain, and transforms it into a polyelectrolyte. As a result, the water-binding capacity of the modified product (CMC) is greatly increased over that of the parent compound and, depending on the degree of substitution (DS), the CMC will form colloidal solutions. The careful and purposeful control of the degree of polymerization, the degree of substitution, and the uniformity of the substituents are the major technological parameters by which CMC manufacturers develop the properties required by the food applications.

Solutions of CMC in water supply various degrees of viscosities. Depending on the particular combinations of the above listed parameters, a 2% aqueous solution of CMC may have viscosities in the 10 to 50,000 cps range. The flow characteristics of the CMC solutions are mostly non-Newtonian, pseudo-plastic, indicating that the CMC molecules will orient themselves in the direction of the movement of the liquid. By varying the molecular weight of the CMC, the flow behavior can be reduced or increased. The viscosity of CMC will depend on the strength of the shear forces also; this property is referred to as thixotrophy. Heat processing of the CMC solutions temporarily reduces the viscosity, but on cooling the viscosity is regained, unless molecular degradation occurred. Such molecular degradation can happen after prolonged heating, or at pH values below 4. Salts of monovalent cations, such as sodium, potassium or ammonium, have no significant effect on CMC solutions provided oxidative anions are not present. The presence of calcium salts, depending on their concentrations, might cause partial insolubilization; trivalent cations cause precipitation. CMC solutions, when heated with proteins, will display colloidal changes, but this effect is not as pronounced as those observed between carrageenan and proteins. CMC solutions are subject to microbial degradations.

Carboxymethylcellulose finds many food application: it is often used as an ingredient in ice cream stabilizers, in dairy substitutes, in puddings, frozen foods, in citrus fruit concentrates, sauces and gravies, and in baked items. In food preservation the film-forming capability of CMC solutions is applied in meats and fish products. CMC is also a good encapsulating agent for emulsifying fats and oils.

The carboxymethylcellulose is Generally Recognized As Safe (GRAS) in foods. Certain types of purified sodium carboxymethylcellulose (cellulose gum) meet standards set by the U.S. Code of Federal Regulations, Title 21, Section 182.1745-Substances that are Generally Recognized As Safe (GRAS) in foods. The FDA defines the direct food additive as the soduim salt of carboxymethylcellulose, not less than 99.5% on a dry weight basis, with a maximum substitution of 0.95 carboxymethyl groups per anhydrous unit, and with a minimum viscosity of 25 cps in a 2% (by weight) aqueous solution at 25° C. Hercules food-grade (F) cellulose gum meets these requirements. There are a number of standardized foods which permit the use of CMC without further ingredient declaration. If label statements are made, the terms "cellulose gum" or "sodium carboxymethylcellulose" are appropriate for use.

Clearly then, the use herein of the terms CMC, cellulose gum, carboxymethylcellulose, sodium carboxymethylcellulose and any other terms which one of ordinary skill in the art would also equate to the terms above listed will and do identify, in clear and sufficient detail, the substance which is claimed as a part of this invention especially where the use of CMC with food products is involved.

It has been found that the addition of 1.50% by weight of Hercules CMC type 7HXF or 7H4F to an alcoholic beverage such as for example gin, results in a gelled or jelly form of the gin. By increasing or decreasing the percent amount of the CMC or by using an alternative type of CMC the resulting ethyl alcohol product will be more or less viscous or thixotropic. It is important to note that the form properties of the product produced by the mixing of the alcoholic beverage with CMC can be adjusted in several ways such as by the amount of CMC per unit weight or unit volume used and also by the type of CMC specified. The product information booklet from Hercules clearly defines the chemical and the physical properties of the available types of food grade CMC which may be used within the scope of this invention. The invention is the products which result from the mixing of ethyl alcohol beverage products with CMC. It is understood that there are many, many variations as to the form of ethyl alcohol products which can be made using one or more of the CMC products in various percent (%) by volume or by weight in combination with the entire variety or product line of alcoholic beverage products currently available and which may become available.

Gin and gin based beverages, bourbons and bourbon based beverages, vodka, scotch and the various beverages based upon these can or have been mixed with CMC in various proportions. All of the products in beverage form after mixing with an appropriate proportion of CMC became gelled or "syrupy" or had a form which would be classified as a non-beverage. It has been found that wines and liqueurs as well as brandies all in various embodiments when mixed with various types and percent (%) amounts resulted in a non-beverage form of the alcoholic beverage product.

There is no formula or program which is or can be used to determine the exact amount and type of CMC to be used with each of the various alcoholic beverage products. To obtain the form, feel and texture desired requires the use of empirical data or trial and error tests.

The Table 1 provides a sample of some of the various mixtures that have been made. In all cases it is important to note that the clarity, the alcoholic proof and the flavor were substantially unchanged from what they were when the product was in beverage form.

TABLE 1

| WEIGHT OF CMC PER 500 ml OF BEVERAGE | APPROX. WEIGHT % | CONSISTENCY | BEVERAGE TYPE |
|---|---|---|---|
| 9.0 grams | 1.60 | Jelly-like | Chocolate Cherry Amaretto Irish Mist Creme de Cassis Swiss Choc. Almond |
| 7.0 grams | 1.25 | Pudding-like | Swiss Choc. Almond |
| 4.5 grams | 0.80 | Syrup-like | Creme de Menthe |
| 15.0 grams | 2.70 | Ice cream-like | Cranberry Liqueur |

While extensive experimentation has not been done using CMC in combination with other alcohols, so long as there is some water within the system, that is the alcohol is not basically pure alcohol, the adding of and preferably the mixing in of CMC with the alcohol will change the form of the alcohol from that of basically a liquid or beverage to another more firm or solid form.

Additionally it has been found that the addition of a small amount of carrageenan, such as for example ¼ to about ¾ of the % by weight of the CMC added, to the mixture of alcohol and CMC will cause the resulting form of the alcoholic product to be more firm and to peak as does whipped cream or whipped egg whites. The carrageenan causes the mix to be slightly less clear than the mix prior to the addition of carrageenan. It has been found that the weight percent (wt. %) of carrageenan may range between about 0.20% to 2.25%. The degree of stiffness or peaking desired will dictate, for a particular combination of alcoholic beverage and CMC, the amount of carrageenan to be added.

The use herein of the term carrageenan means those particular types of carrageenan specifically designed for use in food and/or beverage systems. It is understood that one of ordinary skill in the field of food processing and development would be aware of those types of carrageenan useful in the food and beverage industries. It should also be noted that additional and more detailed information, than is provided herein, regarding the further uses of carrageenan, the chemistry, the detailed properties and the methods for making carrageenan are readily available to those involved in the relevant industry.

Carrageenan is obtained by extraction with water or alkaline water of certain species of the class Rhodophyceae (red seaweeds). It is a hydrocolloid consisting mainly of the potassium, sodium, magnesium and calcium sulphate esters of galactose and 3,6-anhydrogalactose copolymers. The relative proportion of cations existing in carrageenan may be changed during processing to the extent that one may become predominant.

Carrageenan is recovered by alcohol precipitation, by drum drying, or by freezing. The alcohols used during recovery and purification are restricted to methanol, ethanol, and isopropanol. The commercial products classified as carrageenan are frequently diluted with sugars for standardization purposes and mixed with food grade salts required for obtaining gelling or thickening characteristics.

Carrageenan is extracted from the raw material with water at high temperatures. The liquid extract is purified by centrifugation and/or filtration. The liquid extract may be converted into a powder by simple evaporation of water to yield the so called drum dired carrageenan. Proper release of the dried material from the dryer roll requires addition of a small amount of roll-stripping agents (mono- and diglycerides). Drum dried carrageenan finds little use in water gel applications. Most of the carrageenan used in foods is isolated from the liquid extract by selective precipitation of the carrageenan with isopropanol. This process gives a more pure and concentrated product.

Carrageenan is a linear polysaccharide, more specifiacally a galactan with a galactose residues linked with alternating alpha (1→3) linkages and beta (1→4) linkages. In addition, the galactose units linked beta (1→4) in this general structure often occur as 3,6-anhydro-D-galactose and sulphate ester groups may be present on some or all galactose units.

It is evident that since carrageenan is a large molecule being made up of some 1000 residues, the possibility for structural variations are enormous. In order to simplify matters it is convenient to define three main types, kappa, iota, and lambda carrageenans, which are idealized molecules assigned definitive structures. Hardly any seaweed yields these ideal carrageenans. The normal situation is probably a range of intermediate structures.

In food applications and particularly water based food applications where the interest is in gel formation, such gel formation is obtained only in the presence of potassium ions (kappa and iota carrageenan) or calcium ions (iota carrageenan). Carrageenan is a thermoreversible gelling agent. When potassium ions are present, and the system is cooled below the gelling temperature, the carrageenan gels instantaneously. As no methods of releasing postassium slowly from slightly soluble salts or complexes are known today, potassium must be present in the system or added to the system before cooling below the gelling temperature in order to avoid pregelation. However, in certain applications for instance in the making up of solid bacteriological media, gelation by diffusion of potassium ions may be used. Carrageenan may be used in instant preparations (powders to be dissolved in cold water). However, only a thickening effect is obtained, caused by swelling of the carrageenan. In spite of the fact that carrageenan is a weaker gelling agent than agar, carrageenan finds extensive use as a gelling agent and stabilizing agent in the water phase of foods. This is mainly due to carrageenan's ability to produce gels with a wide variety of textures. This is understandable when it is considered that carrageenan is not just a single polymer-type but rather a family of gelling and non-gelling sulfated galactans.

It should also be noted that combination with locust bean gum further expands the texture range available.

Permanent stabilization of a suspension requires that the continuous liquid phase of the food shows a yield value (a gel). Sedimentation rate decreases with decreasing difference in specific gravity and increasing viscosity (Stokes Law). Increased viscosity will slow down the sedimentation but (unless the continuous phase possesses a yield value i.e. is a weak gel, which traps the solid particles) the sedimentation rate will never be zero. Apart from the stabilizing property, carrageenan may be used to increase viscosity and add mouthfeel to a liquid food product.

The Hercules ® GENUVISCO—J type IOTA carrageenan has been used to produce some of the products of the instant invention. Another type used herein in TICALOID 574 made by T.I.C. Corporation.

There is no particularly significant amount of mixing that is needed in order to produce the products of this invention. For products without carrageenan, the mixture need only stand for from at least about six hours in order for it to take on the new form such as syrup or gel etc. The time that it stands is somewhat a function of such factors as the alcoholic proof of the beverage, the ambient temperature and even the particular characteristics of the CMC. Clearly however, the duration the mix stands is not critical. For those products that contain carrageenan, it is necessary that the mixture be heated to between about 160° F. and about 180° F. until the carragenan is dissolved. It should be noted that the upper temperature limit is related only to the rate at which the mixture being made would evaporate needlessly. That is to say, the upper temperature could be higher if there was little or no concern for the evaporation of the mixture. Preferably the carrageenan would be dissolved in the aqueous portion of the mixture and then blended with the portion of the mixture containing the CMC and alcohol or alcohol product being made. An example of a process wherein carrageenan is used as a part of the product is to take about 1/5 or 20% of the amount of beverage product that is to be gelled and add the desired amount of carrageenan. This portion is then stirred and heated to about 180° F. to dissolve the carrageenan. The balance (4/5 or 80%) of the beverage product and the CMC is then added.

Gels formed using CMC can further be made into set gels with the addition of an aluminum salt such as basic aluminum acetate (BAA) or aluminum formoacetate (AFA). Thus the non-beverage form of the alcoholic beverage product, with the addition of aluminum salt, can be made in the form of a set gel. Upon fractioning of a firm/set gel, by sieving through a fine mesh sieve, one obtains a pipeable gel i.e., one which can be dispensed through a pipe of the type used in cake decorating.

For all of the alcohol products produced according to the methods of this invention, what Applicant intends to mean by alcohol and by his use of the phrase "alcohol product" are ethyl alcohol and ethyl alcohol as it is used in beverage products such as for example; gin, vodka, bourbon, rum, scotch, tequila, brandy, wine, wine coolers, cordials and liqueurs.

This invention also relates to an edible thickened or gelled composition of a liquid form of food product and the method of making same. More particularly this invention relates to food of as little caloric value as desired made into spreadable gels, ideally transparent for certain usages and opaque for others, similar in consistency to mayonnaise or butter at room temperature. The gels are made pipeable by fractioning "set" gels (gels which are firm and moldable) using at least a 325 mesh sieve. After fractioning the gel is remixed producing a pipeable gel. According to the present invention, a spreadable or pipeable gel can be prepared, for example, with absolutely no sweetening solids such as corn-syrup or sugar and with a high degree of transparency at thicknesses that can be measured in inches.

Considering the consumer's ever increasing demand for fewer and fewer calories, this invention could also provide a valuable alternative for what has been standardly used to impart to a range of foods the kind of shape retaining yet easily deformed under minimal pressure behavior with which they have come to be associated. A most important use for this invention, therefore, will be spreads. Since the consistency of such foods is either oil/fat or sugar based, their caloric contents are quite high. The invention, by contrast, produces a creamily smooth pliable foodstuff that can imitate the spreadability and the texture of mayonnaise, butter, cream cheese or even a bean or pea paste and which, before flavoring, contains neither fat nor calories. As a result, another very important use for this invention will be its use as a butterfat substitute for ice cream since even a flavored water gel processed as described can provide the same mouthfeel of the most premium of ice creams. The taste release of such gels is superior to that of other products served set or molded. Such is true because the more divided or fractioned a food is, the more surface area available with which the taste buds of the tongue may interact. Fruit spreads may thus be produced using less sugar or concentrate than those formulated with either pectin or gelatin.

The basic process for the production of such spreadable-pipeable gels is the fractioning of the set gel. Fractioning, in this instance, can be performed by forcing the set gel through a fine mesh sieve, i.e., fine mesh sieving or sieving. The size of the mesh which has been found to work effectively is a 325 mesh. However, it should be pointed out that any other form of "fractioning" such as for example "whipping" the set gel until it is broken down into smaller particles will also be considered as fractioning the set gel. The set or firm gel may be one obtained from a standard gellant such as carrageenan, agar agar, gelatin, etc. This fractioning process may also be applied to the previously described gels made with alcohol based beverages.

As an example of the process, an aqueous solution of 2% kappa carrageenan, is heated to dissolve the carrageenan. The gel formed on cooling is forced or extruded through two or three successively finer seives, the last being of 325 mesh. The result is a gel which is like the piping gel commercially prepared with corn-syrup and agar agar and is shape retaining but plastically deformable under minimally applied pressure. It is not a set gel. Pliability can be increased, if desired, by the addtion at this stage of a proportional amount of the liquid employed but to which no gellant has been added. This pipeable gel has advantages over the currently available gels which are additional to the low caloric content such as a greater degree of transparancy providing for more creative latitude in the use of the spreadable/pipeable gel according to this invention.

Because the yield value (the amount of gelation and its firmness) of this invention is so high, it can be dispensed like soft serve ice cream, for instance, to a height of about 3 to 4 inches. Because it is also so easily tongue destructible, such a gel, especially transparent, could conceivably become another type of dessert along with frozen yogurt, tofutti, soft serve ice cream and the like.

For such an application however, the percentage of the carrageenan, if this is the gellant used, would have to be reduced and/or the seived gel diluted. At 2%, a refrigerated gel of this nature loses the plasticity it exhibited at room temperature becoming somewhat firm and set. Corresponding adjustments must be made therefore to allow both the temperature and the activity of the tongue to consume it as easily as any of the frozen soft serve desserts on the market.

Because individual carrageenan particles in solution will swell but not dissolve if unheated, other claims to this invention have therefore been made.

A 2% iota carrageenan, for instance, sets very much like a standard gel if dispersed in cold water. Shearing, however, affects the cohesive nature of this gel, allowing it, for a short period of time, to acquire the same spreadable or pipeable behavior of the fractured or particulated types already described. A commercially operated dispenser for a soft serve dessert product would therefore work either on seive or screw extrusion principles. For home use in which a much smaller quantity is to be employed, stirring is all that will be required if the product were packaged in a cup or jar while squeezing or kneading would be sufficient if sold by the tube instead. A fine mesh sieve positioned over the tube's aperture, would of course provide the same effect.

A possible attraction or advantage of this particular gel type is the ability to revert back to a set gel moments or minutes later depending on the temperature. This characteristic, for example, would allow for greater protection of piped decoration, preventing the easy smudging of either the kappa formulated gels discussed here or the piping gels presently marketed.

Applicant is not aware of anyone who has combined the gelation of alcohol based beverage products which fractioning to obtain spreadable and pipeable gels. Neither is applicant aware of the use of the fractioning process to change a firm or set gel into a spreadable and pipeable gel.

It is thought that the methods for the gelation of the products and the compositions of the products produced and many of the attendant advantages will be understood from the foregoing description and it will be apparent that various changes may be made in the methods, the form, and the compositions thereof without departing from the spirit and scope of the invention or sacrificing all of the material advantages, the form or forms of the invention hereinbefore described being merely preferred or exemplary enbodiments thereof.

I claim:

1. An edible thickened or gelled composition of a liquid form of food product comprising:
   a weight amount of said liquid form of food product to be gelled;
   food grade carboxymethylcellulose in an amount of between about 0.80% and about 3.00% of said amount by weight of said liquid form of food product and wherein said food grade carboxymethylcellulose is characterized by having a degree of substitution of 7;
   fractioning by sieving said composition through a fine mesh sieve; and
   restirring said sieved mixture thereby producing said edible thickened or gelled composition in the form of a pipeable gel.

2. The edible thickened or gelled composition of a liquid form of food product according to claim 1 further comprising food grade carrageenan in an amount of between about 0.20% and 2.25% of said amount of said carboxymethylcellulose.

3. An edible thickened or gelled ethyl alcohol composition comprising:
   a weight amount of less than 200 proof ethyl alcohol;
   food grade carboxymethylcellulose in an amount of between about 0.80% and about 3.00% of said amount by weight of said ethyl alcohol wherein said ethyl alcohol is present as an alcoholic beverage product selected from the group comprising; gin, vodka, bourbon, rum, scotch, tequila, brandy, wine, wine coolers, cordials and liqueurs thereby producing a non-beverage form of said alcoholic beverage product and having an alcohol percent amount substantially the same as said alcoholic beverage product and wherein said food grade carboxymethylcellulose is characterized by having a degree of substitution of 7.

4. The edible thickened or gelled ethyl alcohol composition according to claim 3, further comprising food grade carrageenan in an amount of between about 0.20% and 2.25% of said amount of said carboxymethylcellulose.

5. An ingestable non-liquid form of an ethyl alcohol based product comprising:
   a liquid form alcohol based beverage; and
   a food grade of carboxymethylcellulose characterized by having a degree of substitution of 7 in an amount of between about 0.80% to about 3.00% by weight of said liquid form alcohol based beverage.

6. The ingestable non-liquid form of an ethyl alcohol based product according to claim 5 further comprising food grade carrageenan in an amount of between about 0.20% and 2.25% of said amount of said carboxymethylcellulose.

7. A method for making an ingestable non-liquid form of an ethyl alcohol based product from a liquid form alcohol based beverage comprising the steps of:
   combining a food grade of carboxymethylcellulose characterized by having a degree of substitution of 7, in an amount of between about 0.80% to about 3.00% by weight of said liquid form alcohol based beverage with said liquid form alcohol based beverage; and
   reacting the combination by allowing it to stand for at least about 6 hours thereby producing said ingestable non-liquid form of ethyl alcohol based product.

8. The method for making an ingestable non-liquid form of an ethyl alcohol based product from a liquid form alcohol based beverage according to claim 7 further comprising the steps of:
   adding to said combination, food grade carrageenan in an amount of between about 0.20% and 2.25% of said amount of said carboxymethylcellulose thereby creating a mixture of the combination of the liquid form alcohol based beverage and the carboxymethylcellulose with said carrageenan;
   stirring said mixture;
   heating said mixture to a temperature of between about 160° F. and 200° F.; and
   cooling said mixture to ambient temperature.

9. The method for making an ingestable non-liquid form of an ethyl alcohol based product from a liquid form alcohol based beverage according to claim 8 further comprising the steps of:
   fractioning by sieving said mixture through a fine mesh sieve; and
   restirring said sieved mixture thereby producing said ingestable non-liquid form of ethyl alcohol based product in the form of a pipeable gel.

10. The method for making an ingestable non-liquid form of an ethyl alcohol based product from a liquid form alcohol based beverage according to claim 9 further comprising the step of adding at least one trivalent metallic salt selected from the group consisting of, aluminum salt, chromium salt and ferric salt.

11. A method for making an edible thickened or gelled composition from a liquid form of composition comprising the steps of:
    combining a food grade of carboxymethylcellulose characterized by having a degree of substitution of 7, in an amount of between about 0.80% to about 3.00% by weight of said liquid form composition with said liquid form composition; and
    reacting the combination by allowing it to stand for at least about 6 hours thereby producing said edible thickened or gelled composition.

12. The method for making an edible thickened or gelled composition from a liquid form composition according to claim 11 further comprising the steps of:
    adding to said combination, food grade carrageenan in an amount of between about 0.20% and 2.25% of said amount of said carboxymethylcellulose thereby creating a mixture of the combination of said liquid form composition and the carboxymethylcellulose with said carrageenan;
    stirring said mixture;
    heating said mixture to a temperature of between about 160° F. and 200° F.; and
    cooling said mixture to ambient temperature.

13. The method for making an edible thickened or gelled composition from a liquid form composition according to claim 12 further comprising the steps of:
    fractioning by sieving said mixture through a fine mesh sieve; and
    restirring said sieved mixture thereby producing said edible thickened or gelled composition in the form of a pipeable gel.

14. The method for making an edible thickened or gelled composition from a liquid form composition according to claim 13 further comprising the step of adding at least one trivalent metallic salt selected from the group consisting of, aluminum salt, chromium salt and ferric salt.

* * * * *